United States Patent [19]

Kim et al.

[11] Patent Number: 5,154,907
[45] Date of Patent: Oct. 13, 1992

[54] PROCESS FOR THE CONTINUOUS PRODUCTION OF HIGH PURITY, ULTRA-FINE, ALUMINUM NITRIDE POWDER BY THE CARBO-NITRIDIZATION OF ALUMINA

[75] Inventors: Jonathan J. Kim, Williamsville; Viswanathan Venkateswaran, Grand Island; Joel D. Katz; Carl H. McMurtry, both of Youngstown, all of N.Y.; Ajit Y. Sane, Medina, Ohio

[73] Assignee: The Carborundum Company, Cleveland, Ohio

[21] Appl. No.: 515,789

[22] Filed: Apr. 25, 1990

Related U.S. Application Data

[63] Continuation of Ser. No. 404,006, Sep. 5, 1989, abandoned, which is a continuation of Ser. No. 918,980, Oct. 15, 1986, abandoned.

[51] Int. Cl.$^5$ ............................................. C01B 21/072
[52] U.S. Cl. ...................................................... 423/412
[58] Field of Search ......................................... 423/412

[56] References Cited

U.S. PATENT DOCUMENTS

| | | | |
|---|---|---|---|
| 987,408 | 3/1911 | Serpek | 423/412 |
| 1,188,770 | 6/1916 | Hershman | 423/412 |
| 1,268,240 | 6/1918 | Greulich et al. | 423/412 |
| 3,032,398 | 5/1962 | Clair | 423/412 |
| 3,304,249 | 2/1967 | Katz | 204/164 |
| 3,307,908 | 3/1967 | Mandorf | |
| 3,334,974 | 8/1967 | Fletcher et al. | 423/411 |

FOREIGN PATENT DOCUMENTS

| | | | |
|---|---|---|---|
| 631097 | 11/1961 | Canada | 423/412 |
| 10760909 | 2/1960 | Fed. Rep. of Germany | 423/412 |
| 62804 | 5/1980 | Japan | 423/409 |
| 23544 | 2/1912 | United Kingdom | 423/412 |
| 277715 | 12/1928 | United Kingdom | 423/409 |

Primary Examiner—Wayne A. Langel
Attorney, Agent, or Firm—Heidi A. Boehlefeld; Joseph G. Curatolo; Larry W. Evans

[57] ABSTRACT

A process for the manufacture of high purity, ultra-fine aluminum nitride powder by the carbo-nitridization of alumina. Agglomerates uniform in both size, chemical composition and porosity are formed containing a stoichiometric mixture of alumina and carbon with the addition of a small amount of catalyst. The agglomerates are furnaced in a controlled manner in a well-mixed reaction vessel to achieve a uniform and consistent level of conversion. Milling of the as-reacted agglomerates under a controlled atmosphere will produce high purity, micron sized aluminum nitride powder.

15 Claims, 3 Drawing Sheets

PROCESS FOR THE CONTINUOUS PRODUCTION OF HIGH PURITY, ULTRA-FINE, ALUMINUM NITRIDE POWDER BY THE CARBO-NITRIDIZATION OF ALUMINA

This is a File Wrapper continuation of co-pending application Ser. No. 07/404,006 filed Sep. 5, 1989, abandoned, which is a continuation of Ser. No. 06/918,980 filed Oct. 15, 1986, abandoned.

BACKGROUND OF THE INVENTION

In theory, the simplest method to prepare aluminum nitride is to heat aluminum metal in the presence of nitrogen; this method is called direct nitridization. In practice, this method is more difficult than it first appears. Since aluminum melts at about 660° C. and the reaction of aluminum and nitrogen begins in general at about 800° C., the aluminum will melt and coalesce into a pool before the reaction begins, which prevents an intimate contact of the reactants. Furthermore, once formed, the aluminum nitride coating acts as a skin or barrier to further reactions. Thus, very low yields are obtained, and the purity of the product aluminum nitride is low because of the large quantities of unreacted aluminum present.

Aluminum nitride can also be obtained by reacting nitrogen with a mixture of aluminum oxide and carbon which has been raised to a high temperature. In order to obtain practically complete conversion of the aluminum oxide to the nitride, it is important that the temperature does not exceed 1800° C., while insuring sufficient nitrogen flow at all times through the entire space filled with the charge of the raw solid material. Any overheating involves volatilizations which impair the efficiency of the reaction, are detrimental to the quality of the end product, and may cause sintering which prevents the continuous operation of the furnace. Lack of nitrogen, even locally, brings about fusion with partial sintering of the charge, so that the completion of the nitriding operation becomes impossible.

Because of the foregoing problems, the commercially available aluminum nitride powder is very expensive. Aluminum nitride is usually produced by nitriding pure aluminum powder (approximately 300 mesh) in a two-step operation. First, the aluminum powder is nitrided for an extended period at about 600° C. to form a coating of aluminum nitride, which prevents coalescense of the molten particles. This is followed by a second treatment in nitrogen at approximately 1200°–1400° C. The product treated in nitrogen at 1200°–1400° C. is unstable to moisture and hydrolyzes very easily. To stabilize the product, additional heat treatment at about 2000° C. is required. In short, the process is slow, tedious, and not cost effective.

U.S. Pat. No. 3,307,908 to Victor Mandorf, Jr. describes a further process for preparing aluminum nitride, which process comprises forming a mixture consisting of finely-divided aluminum metal in the amount of 30–60% by weight and finely-divided carrier material in the amount of 70–40% by weight. The carrier material is selected from the group consisting of aluminum nitride, aluminum fluoride, and mixtures thereof. In this process, a nitriding atmosphere is provided around the mixture which is inert to aluminum nitride and free from oxygen and other materials which interfere with nitriding. Generally, this atmosphere consists of a mixture of nitrogen and ammonia. The mixture is then heated to at least 800° C. while under said atmosphere, thereby nitriding the aluminum to form aluminum nitride.

In U.S. Pat. No. 3,032,398 to Clair, another process for preparing aluminum nitride is disclosed. That process comprises forming particulate material composed of aluminum oxide, carbon and a calcium aluminate binder, continuously passing the particulate material downward by gravity into an elongated externally heated reaction zone wherein the particulate material is heated uniformly to a temperature not in excess of 1750° C., continuously passing a current of nitrogen into said zone, countercurrent to the descended particulate material, to form aluminum nitride. In the process of the Clair patent, an electrically heated shaft furnace is used to conduct the reaction and certain quantities of aluminate of lime, a binder, are required to prevent disintegration during the entire nitriding process. The binder causes crust formation which hinders the proper downward flow of the aluminum oxide-carbon pellets or agglomerates. This system also requires that the reaction temperature be kept at 1750° C. or below. It appears that unless the temperature is kept that low, the reaction product is not easy to grind and cannot be used for its intended purpose.

It is felt that the requirements in the Clair patent are the result of performing the continuous production of aluminum nitride using a countercurrent electric shaft furnace. The electric shaft furnace disclosed by Clair is not a good reaction vessel for conducting this reaction. Clair conducted his process below 1750° C. to avoid sintering of agglomerates, which interferes with the flow of nitrogen to the core of the agglomerate. Good gas particle mixing is absent in this reactor vessel and a local lack of nitrogen is a frequent occurrence. This factor, along with the attendent uneven heating which results since the reaction vessel is heated by resistances from the shell inward, cause the endothermic conversion reaction to stop, and the charge to overheat and fuse together along the walls of the reactor. Once all or part of the charge is fused, operation of the shaft furnace becomes difficult since the charge is no longer free flowing. Additionally, hard crusts of calcium and carbon form in the cooler (1200°–1300° C.) parts of the furnace which also hinder the proper downward flow of the agglomerate. In summary, the electric shaft furnace is plagued by poor gas agglomerate mixing, inadequate thermal uniformity and agglomerate flow problems.

In the past, catalysts, such as calcium fluoride, either were not used or were found to be ineffective. Clair, in U.S. Pat. No. 3,032,398, mentions the use of calcium aluminate as a binder for pelletizing but makes no mention of a catalyst. Sodium fluoride has been used as a catalyst for the direct nitridization of aluminum powder.

Therefore, it is an object of the present invention to provide a process and apparatus for preparing aluminum nitride, which process is capable of a high rate of production and an extremely pure product.

It is a further object of the present invention to provide a continuous process and an apparatus for the preparation of aluminum nitride by carbo-nitridization, which process is capable of a high rate of production and an extremely pure product.

It is another object of the present invention to provide a process and a device for the preparation of aluminum nitride by the carbo-nitridization of alumina, which is capable of producing a high rate of production, and an extremely pure product and cost effective product.

It is another object of the present invention to provide an efficient and cost effective process and a device for the preparation of aluminum nitride by the carbo-nitridization of alumina in which a catalyst allows the reaction to be conducted at temperatures in the range of 1600°–1850° C.

SUMMARY OF THE INVENTION

This invention is a multi-step, integrated process for the manufacture of high purity, ultra-fine aluminum nitride powder by the carbo-nitridization of alumina. The process comprises formation of agglomerates uniform in both size and chemical composition containing a stoichiometric mixture of alumina and carbon with the addition of a small amount of catalyst, precisely controlled furnacing of these agglomerates in a well-mixed reaction vessel to achieve a uniform and consistent level of conversion and milling of the as-reacted agglomerates under a controlled atmosphere to produce high purity, micron sized powder.

DETAILED DESCRIPTION OF THE INVENTION

Figure 1:
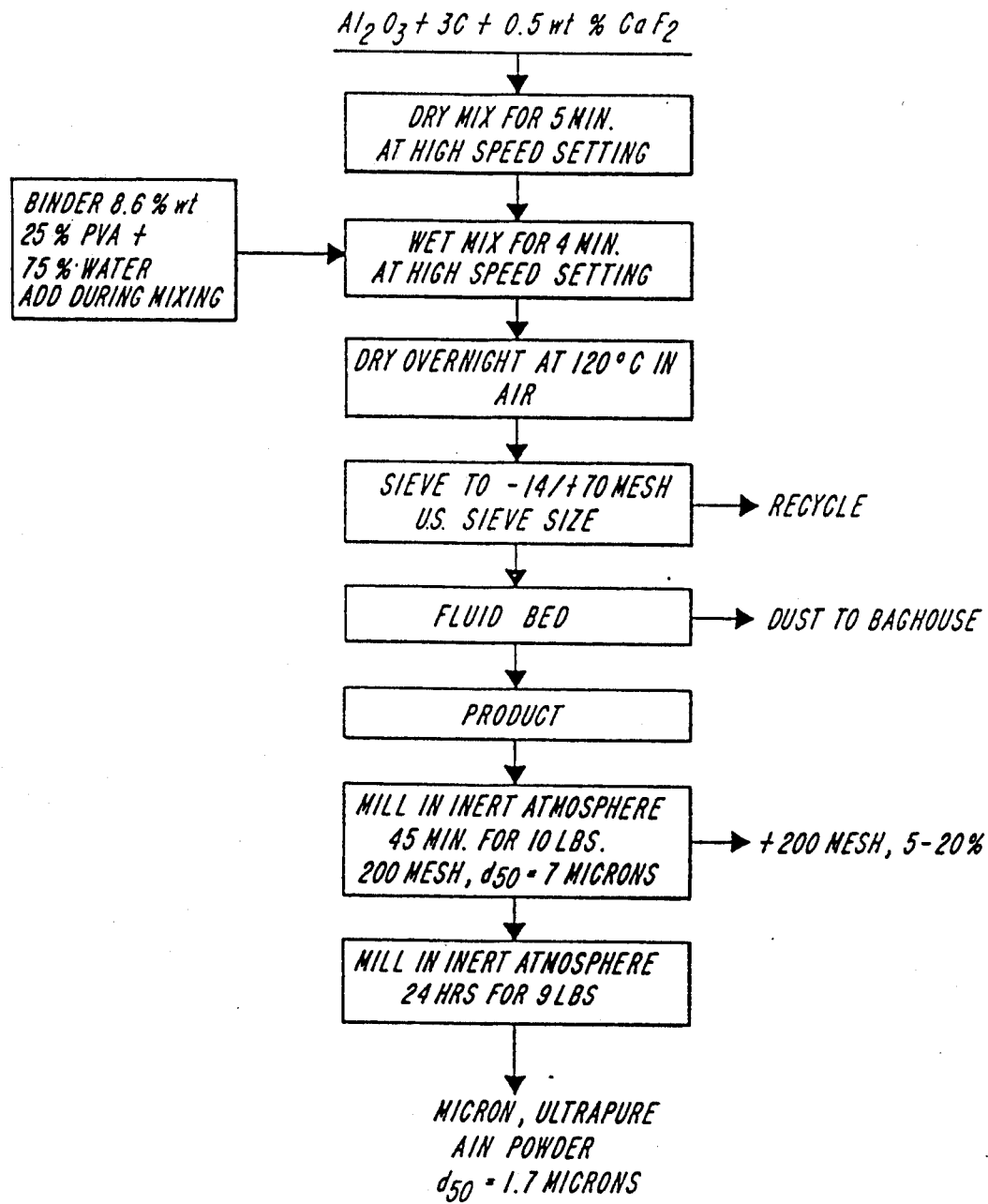
FIG. 1 is a flow diagram of the process of the present invention.

The carbo-nitridization of alumina takes place via the following overall reaction:

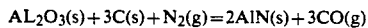

$$AL_2O_3(s) + 3C(s) + N_2(g) = 2AlN(s) + 3CO(g)$$

When properly controlled, this reaction can be used to produce micron sized aluminum nitride powder of greater than 99% purity.

High purity aluminum nitride may be produced by several high temperature processes. Among those which have been successful are the rotary kiln, packed bed reactor and fluid bed reactor. The fluid bed reactor process is ideal for operation in the continuous mode to produce large volumes of high purity aluminum nitride.

A continuous fluid bed reactor is an ideal process reactor for the carbo-nitridization of alumina for several reasons. A fluid bed reactor provides excellent mixing of the agglomerates with a gas phase and good gas utilization. Because of the excellent agglomerate gas mixing, the reactor also has a very even temperature profile. The good thermal mixing results in a uniform reaction, independent of whether the reaction is exothermic or endothermic as in the present case. These factors result in a consistently high and uniform degree of conversion when a continuous fluid bed is used, provided the alumina-carbon pellets are properly produced as described herein. The process of the present invention will be further described in light of the use of a fluid bed reactor which is the preferred reaction vessel for the process of the present invention.

The method of the present invention comprises formation of agglomerates uniform in both size and chemical composition containing a stoichiometric mixture of alumina and carbon with a small amount of catalyst, precisely controlled furnacing of these agglomerates in a well-mixed reaction vessel to achieve a uniform and consistent level of conversion and milling of the as-reacted agglomerates under a very well controlled atmosphere to produce a high purity micron sized powder. Among the variables to be optimized in the process of the present invention are the quality of the initial reactants, the operating temperature, the nitrogen flow rate, the residence time in the fluid bed reactor, pellet size and pellet feed rate.

Initially, agglomerates uniform in both size and chemical composition, consisting of a stoichiometric mixture of alumina and carbon with the addition of a small amount of catalyst, are formed. The feed material for producing aluminum nitride consists of pellets of aluminum oxide ($Al_2O_3$) and carbon with a catalyst. In order to obtain a high surface area aluminum nitride, it is preferable to start with a high surface area alumina, preferably of 1–50 $m^2/g$ surface area. The catalyst, preferably $CaF_2$, has no detrimental effect on the surface area or size of the aluminum nitride. For example, to make a batch of 60 lbs of feed, 73.5 wt. % of Alumina (A-16) which can be obtained from Alcoa Corporation, 26.0 wt. % carbon (Thermax) and 0.5 wt. % of calcium fluoride are dry mixed in an Eirich mixer which can be obtained from Eirich Machine Inc., New York, N.Y., for five minutes at high setting, to intimately blend the mixture. Agglomeration is accomplished by wet mixing with 12 wt. % of polyvinyl alcohol solution (25% by volume polyvinyl alcohol and 75% by volume water) for four minutes at high setting. The four minutes includes three minutes required to add the polyvinyl alcohol solution. The agglomerated feed is dried in an oven at 120° C. in a pan. The dried agglomerates are sieved through 14 and 70 mesh. The above-mentioned procedure results in 80–85% of the agglomerate in −14/+70 size fraction with $d_{50}$ of approximately 35 mesh.

It is especially important to the ultimate purity and particle size obtainable that the agglomeration process produce highly uniform pellets of the desired size and chemical composition. Since there is no transport of alumina or carbon between the pellets in a fluid bed reactor, and limited transfer within, each pellet must contain a stoichiometric and uniform mixture of the components to achieve a high degree of conversion without excessive grain growth, a condition wherein the aluminum nitride grains get bigger and sinter together so that they are harder to grind. When a catalyst is used to accelerate the reaction, it too must be uniformly distributed within the agglomerate.

In addition, for the reaction to continue, nitrogen gas must continuously pass into the pellets and carbon monoxide must be released from them. The pellets must therefore be porous and their porosity controls the rate of the conversion reaction. Since the rate of chemical conversion is in part dictated by pore size and density, it is of equal importance that pore size and the distribution of pores within each agglomerate be uniform.

Uniformly sized pellets are also important to the method of the present invention. A well-controlled size distribution is essential to the efficient operation of a continuous fluid bed reactor for the following reasons. The residence time of an agglomerate in the bed is a function of the size, with the rate of the conversion reaction being faster for smaller pellets. Accordingly, segregation of agglomerates by size within the bed will occur, both of which will result in poor as-reacted uniformity. Additionally, it has been shown, independent of the type of reactor used, that the rate of the conversion reaction is a function of agglomerate diameter. If big pellets and small pellets are put into the reactor together, and the pellets are left in until even the big pellets have reacted, grain growth will occur in the smaller pellets. Consideration of the above factors indicates that if the pellet size is not adequately controlled, the products will be non-uniform and of low purity.

Typically, the gas velocity for fluidization is chosen based on the mean particle size. For the case of this illustration, a gas flow rate of 2 standard cubic feed per minute (SCFM) was chosen since this flow rate results in the minimum fluidization velocity for a mean agglomerate size of 500 microns. An advantage of using the minimum fluidization is that good nitrogen utilization is achieved. If the size distribution of the agglomerates is too large, the fine particles will be blown out of the top of the bed and the coarse particles will sink to the bottom of the bed.

Additionally, the pellets must be porous, to ensure that the reaction is complete during furnacing. The fluid-bed reactor used for this illustration has an internal diameter of 8" and a bed height of 20". Heating is provided by a 42" high, 22" diameter induction coil which is concentric with the fluid bed. The fluid bed is operated continuously for over 200 hours with a nitrogen gas flow rate of 2 SCFM. The pellets will have a residence time in the fluid bed of from 3 to 20 hours depending on the temperature and the desired level of conversion. The effect of temperature and feedrate on the level of conversion is illustrated in Table 1. To achieve the same degree of conversion at a lower reaction temperature, a slower feedrate is necessary. The relationship between feedrate and temperature is not linear or obvious, and hence, must be determined by careful variation of operating parameters.

TABLE 1

| TEMPERATURE VS FEEDRATE OPTIMIZATION | | | |
|---|---|---|---|
| Temp °C. | Feedrate (Lb/Hr) | Oxygen wt % | Carbon wt % |
| 1660° C. | 1.44 | 2.38 | 2.49 |
| 1650° C. | .75 | .94 | .71 |
| 1650° C. | 1.37 | 1.04 | 1.00 |
| 1700° C. | 1.24 | .64 | .61 |
| 1700° C. | 6.25 | 4.43 | 3.87 |
| 1750° C. | 2.71 | .53 | .50 |
| 1750° C. | 6.25 | 2.75 | 2.20 |

If the pellets do not have uniform porosity, the reaction is not uniform. Therefore, if 100% conversion of the product is the desired goal, the pellets must have uniform porosity and the pores must be uniform. If the pellets each contain some big pores and some small pores, and the pellets are left in the furnace longer to wait for all of the pellets to react, grain growth occurs. In this situation, the grain size is not uniform and the agglomerates will be harder to grind to a uniform powder size.

The agglomerates as formed are then furnaced. Pellets of aluminum oxide, carbon and the catalyst of the desired mesh size are charged at the rate of 0.5-6 lb/hrs, preferably 3.0 lb/hr, through a graphite feed chute which extends all the way below the surface of the fluidized bed. In order to produce high purity aluminum nitride which can be milled to yield ultra-fine powder, the temperature at which the carbo-nitridization reaction is conducted must be considered. At higher temperatures, aluminum nitride grains sinter together into large, hard pellets which are difficult to grind. The reaction should be performed at temperatures low enough so that the appreciable sintering and grain growth are avoided. If a significant amount of sintering occurs, the as-reacted pellets will be difficult to mill, requiring excessive milling time. The amount of milling time to produce micron size powders should be kept to a minimum since contamination during milling is a function of time. Proper control of the reaction temperature is, therefore, essential to produce friable as-reacted pellets which are easily milled, and hence, will maintain their high purity after micronizing. In the present invention, the reaction can be conducted economically at lower temperatures because of the action of the catalyst.

To achieve the desired friability, the reaction must be conducted below 1850° C., preferably in the range of 1600°-1800° C. In the past, it was thought that operating the reactor in such a low temperature range was undesirable in terms of production rate, since this process, as are most high temperature conversion reactions, is thermally activated and decreasing reaction temperature drastically lowers the production rate. To make production in lower temperature regions practical, the present invention uses a catalyst. Calcium fluoride when added in the correct amount has been determined to behave as a catalyst at the reaction temperature of interest. Concentrations of between 0.1 and 0.75 wt % $CaF_2$ have been determined to have a good catalytic effect. Too high a concentration of $CaF_2$ (2.5 wt %) was found to result in diminished catalytic activity. Other fluorides, such as yttrium fluoride ($YF_3$) are believed to have a similar catalytic effect in the process of the present reaction in the 1600°-1800° C. range instead of at higher temperatures. As excessive sintering occurs, the conversion reaction slows down and achieving a high degree of conversion without a large amount of grain growth becomes impossible. Furnacing conditions must be well controlled to avoid excessive grain growth. A uniform aluminum nitride grain size is necessary to produce micron size powder suitable for further processing. Grain growth is undesirable since it makes milling to produce ultra-fine powders very difficult.

The agglomerates are furnaced for approximately 3-20 hours in the fluid bed reactor. The preferred fluid bed reactor for the process of the present invention is described in copending application entitled "Method and Apparatus to Produce a Hot Fluidizing Gas" to J. Kim et al, U.S. Ser. No. 918,911, which issued as U.S. Pat. No. 4,790,986, filed on even date herewith, the teachings of which are incorporated within by reference.

Figure 2:
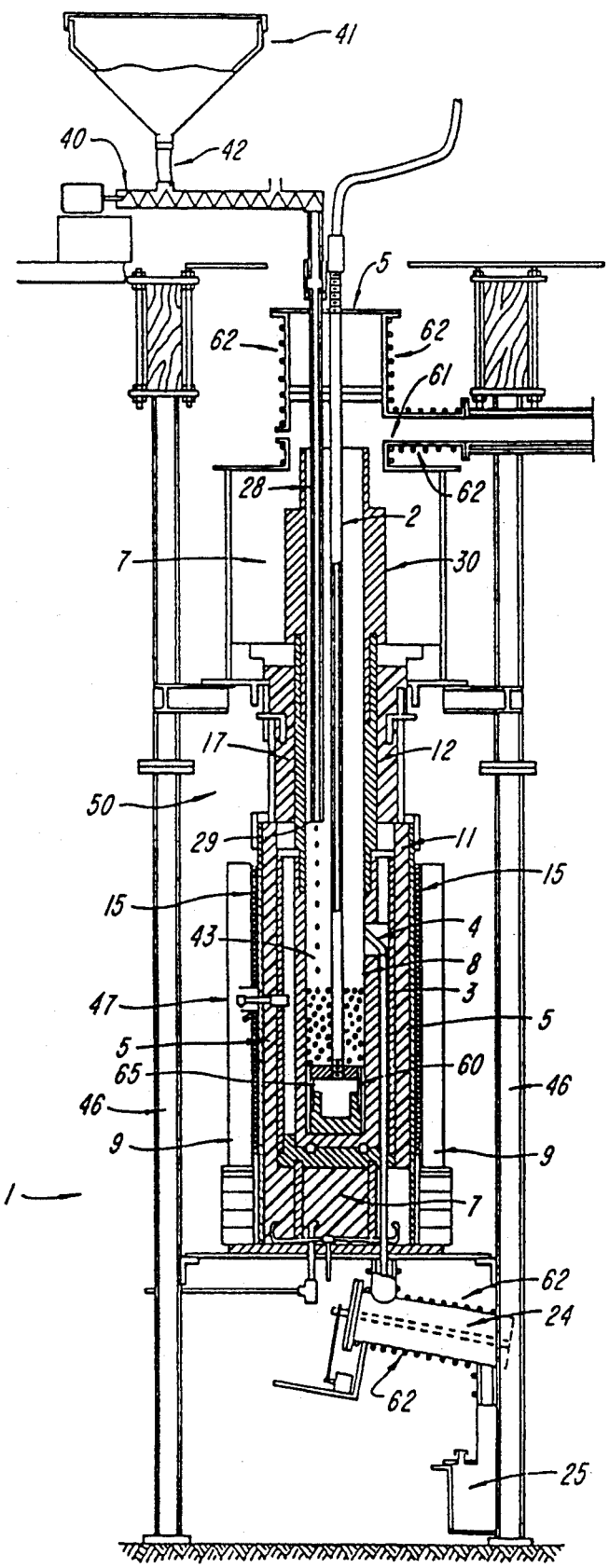
FIG. 2 is a vertical sectional view of the fluid bed reactor which is the preferred reaction vessel for the process of the present invention.

As shown in FIG. 2, the fluid bed reactor 1 comprises a furnace reactor 50 which is in turn comprised of three chambers in communication with each other. The lower furnace chamber 8, the reaction chamber, is a cylindrical-shaped graphite tube with a closed bottom and a machined top. The middle furnace chamber 12 is a cylindrical-shaped graphite tube which is machined at the top and bottom to sleeve fit securely with the lower furnace chamber 8 and the upper furnace chamber 30. The upper furnace chamber 30 is a cylindrical-shaped graphite tube machined for sleeve fit on both ends. The entire furnace is supported by four steel columns 46. All metallic parts are kept at a safe distance from the induction coil 15, described below. sleeve fit on both ends. The entire furnace is supported by four steel columns 46. All metallic parts are kept at a safe distance from the induction coil 15, described below.

The heat input is provided by a thirty-seven turn induction coil 15, surrounding the lower furnace chamber 8, which heats a susceptor 11. The susceptor is a long graphite cylinder with an open bottom and an open top which is positioned within the area bound by the induction coil 15 and the lower furnace chamber 8. Insulation 5 is provided in the space between the induction coil 15 and the susceptor 11, preferably by Thermax carbon powder. Carbon felt 17 is used as insulation around the top portion of the induction coil 15. Wood planks 9 are positioned on the side of the induction coil 15 furthest from the susceptor 11 to support the induction coil 15 and to hold them in place. Carbon black 7 provides an additional source of insulation in the reactor 1 for efficient heating. In operation, the susceptor 11 induces or draws energy from the induction coil 15 and heats the lower chamber 8 by radiation. The susceptor 11 acts as a second wall of the reaction chamber in case of rupture of the first wall. Rupture is common when performing this type of process because the abrasive agglomerates erode the wall of the chamber. A rupture in the wall can cause heat to escape, which may injure workers in the area. It may even cause an explosion, damaging the reactor, the surrounding equipment and having the potential to critically harm personnel.

The fluidized bed 43 is positioned within the lower furnace chamber 8. When the fluid bed reactor 1 is operating under normal operating conditions, the fluidized bed spans the middle portion of the induction coil 15.

For regulated continuous charging, the agglomerated feed is introduced into the fluid bed reactor 1 by way of a weighted supply bin or hopper 41. A screw feeder 40 connected to the hopper by a flexible chute 42 transports the feed down a long graphite feed chute 28 to the feed chute end 29 located within the middle furnace chamber 12. The feed then free falls into the lower furnace chamber 8 where treatment will occur.

At the same time, nitrogen fluidizing gas is supplied from the top of the furnace 50 through a graphite inlet line or conduit 2 which extends from the top of furnace 50 through the upper 30 middle 12 and lower 8 furnace chambers to a bubble cap 60 located within the lower furnace chamber 8 and positioned below the fluidized bed or reaction zone 43. The number of joints in the gas conduit line 2 have been minimized in order to avoid gas leaks. Introduction of the fluidizing gas from the top of the furnace and through the zone heated by the induction coil 15 results in the gas attaining a very high temperature before entering the fluidized bed 43. The heated gas enters the bubble cap 60 through the top.

Figure 3:
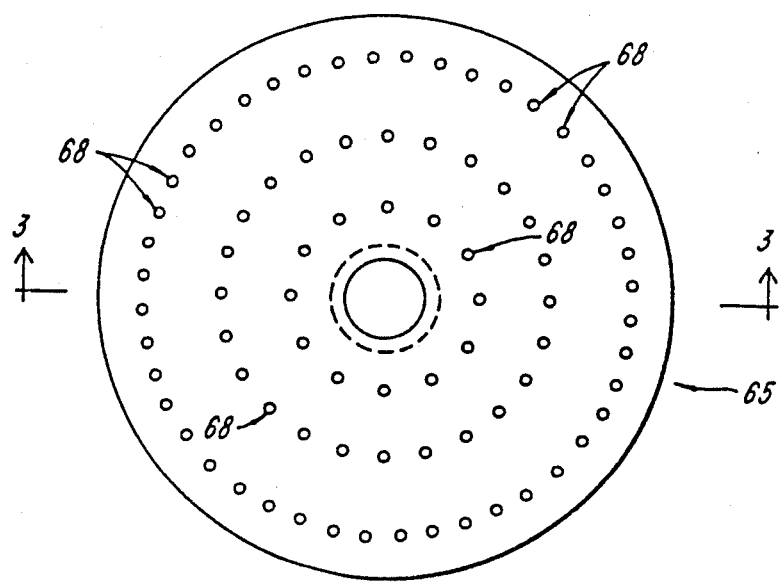
FIG. 3 is a plan view of the lid of the bubble cap of the fluid bed reactor shown in FIG. 2.
Figure 4:
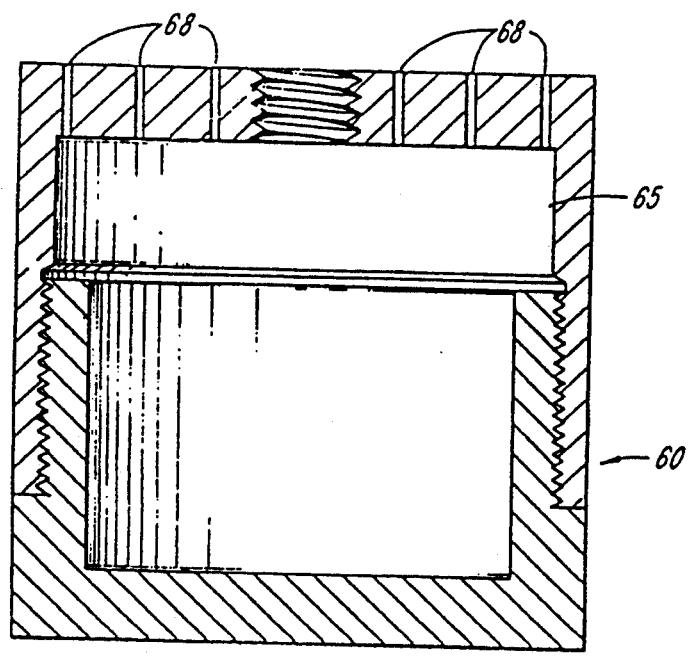
FIG. 4 is a vertical sectional view of the bubble cap of the fluid bed reactor shown in FIG. 2.

FIGS. 3 and 4 illustrate the bubble cap 60 in greater detail. The bubble cap 60 comprises a graphite chamber having a graphite top or lid 65 fitted to the chamber by use of a screw joint. The lid of the bubble cap 65 is formed with a plurality of holes 68 to allow for escape of the hot fluidizing gas therethrough. The inlet line 2 for the fluidizing gas communicates with and terminates in the lid 65 of the bubble cap 60. The bubble cap is positioned at the lower end of the heating zone with the fluidizing gas being delivered to the bubble cap from a source above the heating zone through the conduit 2 with the gas being heated within the conduit as the gas passes through the entire hating zone.

Thus in operation, the fluidizing gas descends through the inlet line 2 into the bubble cap 60. It then rises up through the lid 65 of the bubble cap into the reaction chamber 8. The rising preheated fluidizing gas causes the feed which has been released from the end of the feed chute 29 to fluidize as it remains in the reaction chamber 8. More importantly, the rising exhaust gas begins to lose heat, which is transferred to the fluidizing gas coming down the inlet line 2 to heat it. This transfer helps in maintaining the reactor at a temperature not previously achieved in fluid bed reactors. This countercurrent heat transfer helps in maintaining constant temperatures between the gas and solids resulting in constant conversions. The temperature can be maintained at up to 2000° C. in the reaction chamber 8, as indicated by the pyrometer (not shown), which can be checked through the sight tube 47.

The feed remains in the reaction chamber 8 for a specified amount of time determined by the quality of the product desired. The product is continuously discharged by overflow through a discharge chute plug 4 in the wall of the lower furnace chamber 8 near the surface of the fluidizing bed 43. The hot product is discharged through the product discharge chute 3 (in the discharge chute plug 4) which extends from the reaction chamber 8 into a rotating water cooled cylinder 24 positioned below the furnace 50 and within the steel frames 46. There, the product is cooled to approximately 150° C. to quench the conversion process. The cooled product overflows from the cooled cylinder 24 through a weight actuated dumper 25 positioned below and in communication with said cooled cylinder 24 and supported by said steel frame 46 where it cools to even lower temperatures. Water cooling coils 62 surround said cooled cylinder 24 to assist the cooling process. The rotary cooler may be purged with an inert gas such as nitrogen so that the product does not become oxidized during cooling.

The hot fluidizing gas from the reaction chamber 8 is led through a water cooled connector tube 61 to the cyclone assembly (not shown) which separates the entrained solids. Water cooling coils 62 surround the connector tube to effect cooling. The cyclone also serves the additional purpose of burning any carbon monoxide in the furnace gas. The cyclone/afterburner is lined with insulation to isolate the gases leaving the cyclone at 300° C.

The fluid bed reactor assembly is cooled by 5 cooling water lines. A line (not shown) with a capacity of 30 gpm is used for cooling the power supply (not shown) of the induction coil 15. There are four other parallel lines: an induction coil line for cooling the induction coil 15; a furnace line for cooling the upper furnace chamber 30; a connector tube assembly line for cooling the connector tube assembly; and a rotary drum line for cooling the rotary drum 24. These cooling lines are each marked 62 on the accompanying drawing. The total cooling water requirement of this furnace is 43 gpm.

This reactor 1 is superior to known fluidized bed reactors because of the way the gas is introduced into the reaction chamber. The gas is introduced from the top of the reactor and travels downward toward the bubble cap. As it is traveling downward, the gas is heated by outgoing exhaust gases by countercurrent heat transfer. By countercurrent heat transfer is meant that heat that is lost from the exhaust gas rising from the reactor is transferred to the gas traveling down inlet line 2 toward the bubble cap so there is a very efficient heating system within the reactor.

The as-reacted agglomerates are then milled at the rate of 15 lb/hr. As discussed above, proper control of the reaction temperature prior to milling will decrease the amount of time required to mill to produce micron sized powders. Keeping the milling time at a minimum will also ensure that oxygen pickup is kept to a minimum. Oxygen pickup may be further minimized by performing the milling reaction under an inert atmosphere. Milling can be performed under an inert atmosphere, such as a nitrogen atmosphere. A second milling operation may be performed to achieve a still higher surface area. Among the suitable mills are the Model T-15 Jet Trost mill, which can be obtained from The Plastomer Division of Garloch, Trost Mill Dept., Newtown, Pa. 18940, and the Sweco VIBRO Energy Grinding Mill, which can be obtained from Sweco Inc., Los Angeles, Calif. Other types of mills may also be acceptable. This operation is facilitated by the care taken previously to assure uniformity of the raw powders, the as-agglomerated pellets and of the chemical reaction, as all of these factors are essential for producing a uniform as-reacted aluminum nitride grain size.

The foregoing invention is further illustrated by the following non-limiting examples. In all examples, $N_2$ feed rate is 2 standard cubic ft/min (SCFM).

EXAMPLE 1

Temperature: 1650° C.±5° C.
Pellet composition:
73.5 wt % A-14 (alumina)
26.0 wt % Thermax (Carbon)
0.5 wt % $CaF_2$
Pellet Size: −14/+70 mesh ($d_{50}$=500 microns)
Product Size: −14/+70 mesh ($d_{50}$=400 microns)

|  | Feed (lb/hr) | Discharge (lb/hr) |
|---|---|---|
| Average Rate | 1.37 | 0.79 |
| Standard Deviation | 0.14 | 0.43 |
| Range (low/high) | 1.0 to 1.65 | 0.1 to 3.2 |
| Number of Readings | 24 | 24 |

| | Product Composition | | |
|---|---|---|---|
| | Wt % | Twice Standard Deviation | Number of Samples |
| Carbon | 1.00 | 0.41 | 7 |
| Oxygen | 1.04 | 0.30 | 8 |
| Nitrogen | 31.67 | 0.30 | 8 |
| Aluminum | 61.63 | 1.02 | 2 |

EXAMPLE 2

Temperature: 1700° C.±5° C.
Pellet Composition: Same as Example No. 1
Pellet size: −14/+70 mesh ($d_{50}$=500 microns)
Product size: −14/+70 mesh ($d_{50}$=300 microns)

|  | Feed (lb/hr) | Discharge (lb/hr) |
|---|---|---|
| Average Rate | 1.24 | 0.65 |
| Standard Deviation | 0.1 | 0.32 |
| Range (low/high) | 0.88 to 1.38 | 0.1 to 1.45 |
| Number of Readings | 17 | 17 |

| | Product Composition | | |
|---|---|---|---|
| | Wt % | Twice Standard Deviation | Number of Samples |
| Carbon | 0.61 | 0.08 | 5 |
| Oxygen | 0.64 | 0.17 | 5 |
| Nitrogen | 32.18 | 1.21 | 2 |
| Aluminum | 61.67 | 0.55 | 2 |

EXAMPLE 3

Temperature: 1750° C.±5° C.
Pellet composition: same as Example No. 1
Pellet Size: −14/+70 mesh ($d_{50}$=500 microns)
Product size: −14/+70 mesh ($d_{50}$=600 microns)

|  | Feed (lb/hr) | Discharge (lb/hr) |
|---|---|---|
| Average Rate | 2.71 | 1.30 |
| Standard Deviation | 0.075 | 0.64 |
| Range (low/high) | 2.625 to 2.825 | 0.75 to 2.2 |

| | Product Composition | | |
|---|---|---|---|
| | Wt % | Twice Standard Deviation | Number of Samples |
| Carbon | 0.50 | 0.3 | 7 |
| Oxygen | 0.53 | 0.07 | 7 |
| Nitrogen | 32.86 | 1.14 | 5 |
| Aluminum | 64.56 | 0.83 | 5 |

EXAMPLE 4

| | AS GROUND PARTICLE SIZES | | | |
|---|---|---|---|---|
| | Particle Size (Composition) | | | |
| | After Trost Milling | | | After Sweco Milling |
| Fluid Bed Run | Micron | C % | O % | Micron |
| 39 | 7.11 | 0.39 | 0.56 | 1.69 |
| 43 | 3.78 | 0.81 | 0.91 | 1.65 |

It is apparent that many modifications and variations of this invention as herein set forth may be made without departing from the spirit and scope thereof. The foregoing specific embodiments described are therefore to be considered in all respects as illustrative and not restrictive, the scope of the invention being indicated by the appended claims rather than by the foregoing description and all changes which come within the means and range of equivalency of the claims are therefore intended to be embraced therein.

We claim:

1. A process for the continuous production of alumina nitride comprising:
   forming agglomerates of uniform size and uniform chemical composition of a stoichiometric mixture of aluminum oxide and carbon and between 0.1 and 0.75 weight percent of calcium fluoride;
   furnacing the agglomerates in a fluid bed reaction vessel at temperatures below 1850° C. and in an atmosphere inert to aluminum nitride and free from oxygen to achieve a uniform and consistent level of conversion and produce friable particles which can be milled to yield ultra-fine powder; and
   milling the as reacted agglomerates under a controlled atmosphere to produce high purity micron sized aluminum nitride powder.

2. The process of claim 1 wherein the stoichiometric mixture of reactants comprises 1:3 mole ratio of aluminum oxide to carbon and 0.5% by wt. catalyst.

3. The process of claim 1 wherein furnacing the agglomerates is conducted between the temperature range of 1600°–1800° C.

4. The process of claim 1 wherein the fluid bed reactor comprises:
- a furnace comprising at least three chambers in a vertical arrangement, an upper, middle and lower chamber, the chambers machined to sleeve fit securely with the other chambers;
- an inlet for the agglomerates at the upper end of the reactor;
- means for feeding the agglomerates into the reactor;
- an inlet means for fluidizing nitrogen gas located at the upper end of the reactor;
- a susceptor positioned surrounding the lower chamber;
- heating means positioned surrounding the lower chamber and the susceptor;
- a fluidizing bed in the lower chamber;
- a bubble cap to disperse the fluidizing gas located at the distal end of said inlet means for the fluidizing gas, and below the fluidizing bed, comprising a chamber with a lid having a plurality of holes;
- outlet means for the as-reacted agglomerates located proximal to the top of the fluidizing bed at the upper end of the lower reaction chamber;
- outlet means for reaction gases at the upper end of the furnace; and
- a plurality of cooling means for the reaction gases and the as-reacted agglomerates;

5. The process of claim 4 wherein the as-reacted agglomerates are discharged from the reactor by overflow into a rotating water-cooled cylinder.

6. The process of claim 5 wherein the conversion reaction is quenched in the rotating water-cooled cylinder to approximately 150° C. and then further cooled before milling.

7. The process of claim 6 wherein the furnacing and cooling steps are conducted in an atmosphere inert to aluminum nitride.

8. The process of claim 1 wherein the atmosphere is nitrogen and wherein aluminum nitride containing carbon and oxygen of 0.5 to 1.0% respectfully is produced.

9. The process of claim 1 wherein the residence time in the furnace is 3-20 hours.

10. The process of claim 1 wherein the agglomerates are introduced into the vessel for furnacing at a rate of 0.5-6 lb/hr.

11. A process for the continuous production of aluminum nitride comprising:
- forming agglomerates of uniform porosity and size and homogeneous chemical composition, by mixing a stoichiometric mixture of aluminum oxide and carbon, between 0.1 and 0.75 weight % of calcium fluoride, and polyvinyl alcohol solution as binder;
- drying the wet agglomerates in an oven at 120° C. in a pan to result in a narrow size distribution;
- continuously feeding the agglomerates to a furnace;
- furnacing the agglomerates at a temperature below 1850° C. in a fluid bed reaction vessel to achieve a uniform and consistent level of conversion and produce friable particles which can be milled to yield ultrafine powder;
- continuously removing said friable particles; and
- milling the as-reacted agglomerates in a nitrogen atmosphere to produce high purity micron sized aluminum nitride powder.

12. The process of claim 11 wherein the stoichiometric mixture of reactants comprises a 1:3 mole ratio of aluminum oxide to carbon and typically 0.5% by wt. catalyst.

13. The process of claim 11 wherein furnacing the agglomerates is conducted between the temperature range of 1600°-1800° C.

14. The process of claim 11 wherein the furnacing step is conducted in a fluid bed reactor comprising:
- a furnace comprising at least three chambers in a vertical arrangement, an upper, middle and lower chamber, the chambers machined to sleeve fit securely with the other chambers;
- an inlet for the agglomerates at the upper end of the reactor;
- means for feeding the agglomerates into the reactor;
- an inlet means for fluidizing nitrogen gas located at the upper end of the reactor;
- a susceptor positioned surrounding the lower chamber;
- heating means positioned surrounding the lower chamber and the susceptor;
- a fluidizing bed in the lower chamber;
- a bubble cap to disperse the fluidizing gas located at the distal end of said inlet means for the fluidizing gas, and below the fluidizing bed, comprising a chamber with a lid having a plurality of holes;
- outlet means for the as-reacted agglomerates located proximal to the top of the fluidizing bed at the upper end of the lower reaction chamber;
- outlet means for reaction gases at the upper end of the furnace; and
- a plurality of cooling means for the reaction gases and the as-reacted agglomerates.

15. The process of claim 14 wherein the furnacing step is conducted for approximately 3-20 hours.

* * * * *